(12) United States Patent
Mitlyng

(10) Patent No.: US 8,152,577 B1
(45) Date of Patent: Apr. 10, 2012

(54) ELECTRIC BOAT

(76) Inventor: Randy A. Mitlyng, Rochester, MN (US)

( * ) Notice: Subject to any disclaimer, the term of this patent is extended or adjusted under 35 U.S.C. 154(b) by 157 days.

(21) Appl. No.: 12/769,537

(22) Filed: Apr. 28, 2010

(51) Int. Cl.
*B63H 13/00* (2006.01)

(52) U.S. Cl. .................................. 440/8; 440/6

(58) Field of Classification Search ............... 440/6, 8; 290/54, 55
See application file for complete search history.

(56) References Cited

U.S. PATENT DOCUMENTS

| | | | |
|---|---|---|---|
| 4,324,985 A | 4/1982 | Oman | |
| 4,497,631 A * | 2/1985 | Belanger | 440/8 |
| 4,610,632 A | 9/1986 | Osborne | |
| 6,000,353 A * | 12/1999 | De Leu | 440/6 |
| 6,273,015 B1 | 8/2001 | Motsenbocker et al. | |
| 6,890,224 B2 * | 5/2005 | McCann | 440/6 |
| 7,047,902 B1 | 5/2006 | Little | |
| D556,668 S | 12/2007 | Quinn | |
| 2004/0026930 A1 | 2/2004 | Baggett | |

\* cited by examiner

*Primary Examiner* — Lars A Olson

(57) ABSTRACT

An electric boat comprising a boat housing with a rechargeable battery bank; two wind turbines disposed in sides of the boat housing, the wind turbines are driven by oncoming wind; a first turbine system operatively connected to the wind turbines via a first drive shaft; a transformer's power inverter/charge controller operatively connected to the rechargeable battery and to the first turbine system; an electric motor operatively connected to the transformer's power inverter/charge controller or rechargeable battery; jet pump for propelling the boat, the jet pump is operatively connected to the electric motor; and a plurality of solar panels disposed on the boat housing operatively connected to the rechargeable battery.

4 Claims, 6 Drawing Sheets

MECHANICAL DRIVEN TURBINE

MECHANICAL DRIVEN TURBINE, WIND TURBINE, SOLAR

US 8,152,577 B1

ELECTRIC BOAT

FIELD OF THE INVENTION

The present invention is directed to an electric (e.g., battery-powered) boat, more particularly to an electric (e.g., battery-powered) boat having solar panels for recharging the battery.

BACKGROUND OF THE INVENTION

Many boat owners have found increasing fuel prices to be economically challenging, and many individuals have a desire to use environmentally-friendly vehicles. In addition, the need to refuel a boat limits the amount of time spent on the water. The present invention features an electric boat powered by a rechargeable battery. Without wishing to limit the present invention to any theory or mechanism, it is believed that the electric boat of the present invention can help save users money on fuel (and eliminate the need to refuel) as well as help reduce carbon emissions and pollution. The present invention may be ideal for search-and-rescue operations since it is not necessary to refuel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features an electric boat comprising a boat housing; a rechargeable battery disposed in the boat housing, the battery is operatively connected to a transformer; a first wind turbine disposed in a first side of the boat housing and a second wind turbine disposed in a second side of the boat housing, the wind turbines are driven by oncoming wind, the wind turbines are each operatively connected to the battery and to the transformer; an electric motor operatively connected to the transformer; a first mechanical turbine system operatively connected to the motor via a first drive shaft and to the transformer; a charge controller operatively connected to the battery, the wind turbines, and the mechanical turbine system; jet pump for propelling the boat, the jet pump is operatively connected to the electric motor via the mechanical turbine system; and a plurality of solar panels disposed on the boat housing, the solar panels are operatively connected to the charge controller, the solar panels function to provide power to the rechargeable battery. In some embodiments, the electric boat further comprises a third wind turbine operatively connected to the battery, the transformer, and the charge controller. In some embodiments, the electric boat further comprises a power inverter operatively connected to the transformer. In some embodiments, the electric motor is operatively connected to the jet pump via motor drive shafts.

DESCRIPTION OF PREFERRED EMBODIMENTS

Figure 1:
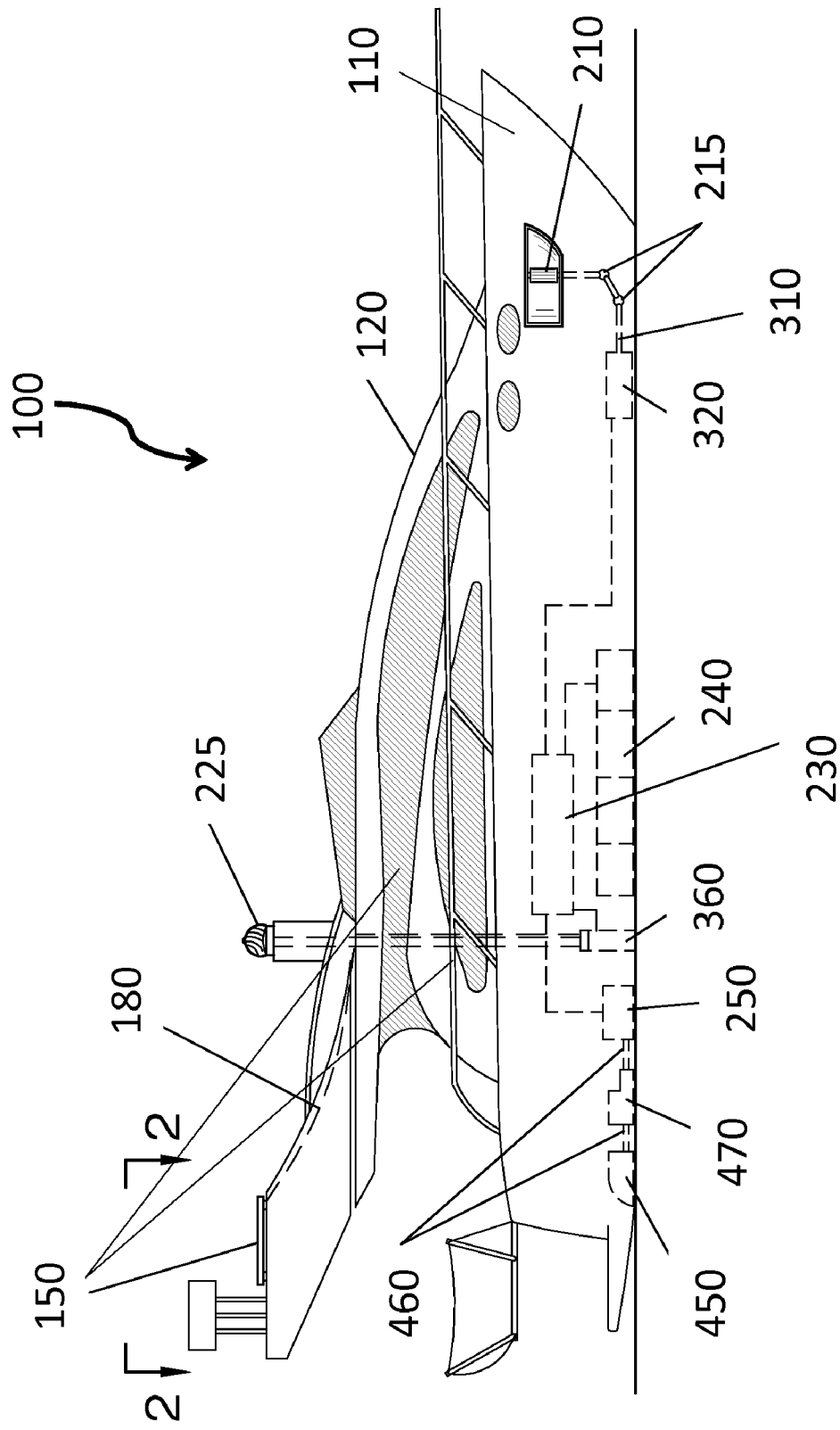
FIG. 1 is a side and internal view of the electric boat of the present invention.

Referring now to FIGS. 1-7, the present invention features an electric boat 100 comprising one or two wind turbines and one or two mechanical turbines. In some embodiments, the electric boat 100 further comprises two bow wind turbines (e.g., for extra voltage for bigger boats). The number of turbines depends on the boat size. For example, a smaller boat may have four or two or one turbine (mechanical and/or wind-driven). In some embodiments, the boat 100 further comprises two or four pumps and/or two or four motors. The number of pumps and motors depends on the desired speed of the boat 100.

Referring now to FIGS. 1-4, the electric boat 100 (e.g., with an electric motor 250 powered via a rechargeable battery 240) comprises a boat housing, similar to standard boat housings. Boat housings are well known to one of ordinary skill in the art. For example, the boat housing comprises a base 110 (with bow and stern), an upper enclosure 120, as well as other standard boat components. A rechargeable battery 240 (e.g., a plurality of rechargeable batteries 240, e.g., a "battery bank") is disposed in the base 110.

Figure 2:
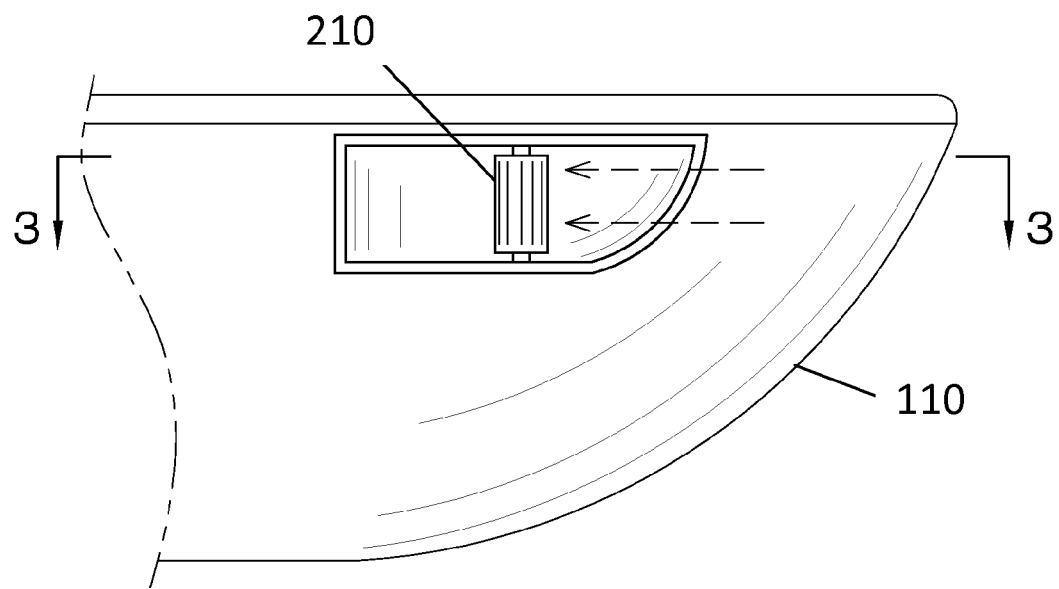
FIG. 2 is a side view of the electric boat of the present invention.
Figure 3:
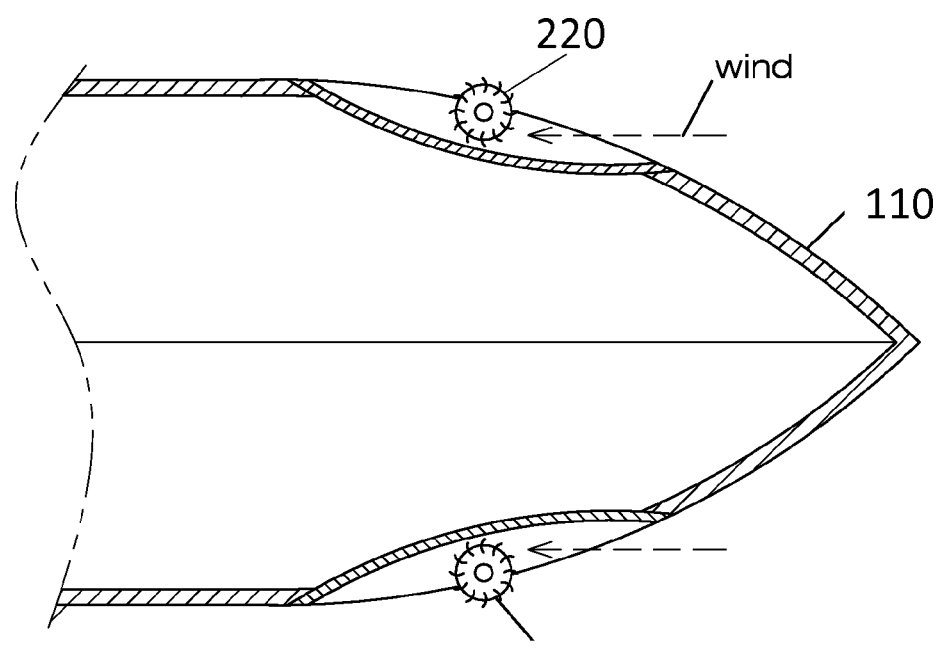
FIG. 3 is a top view of the electric boat of the present invention.
Figure 4:
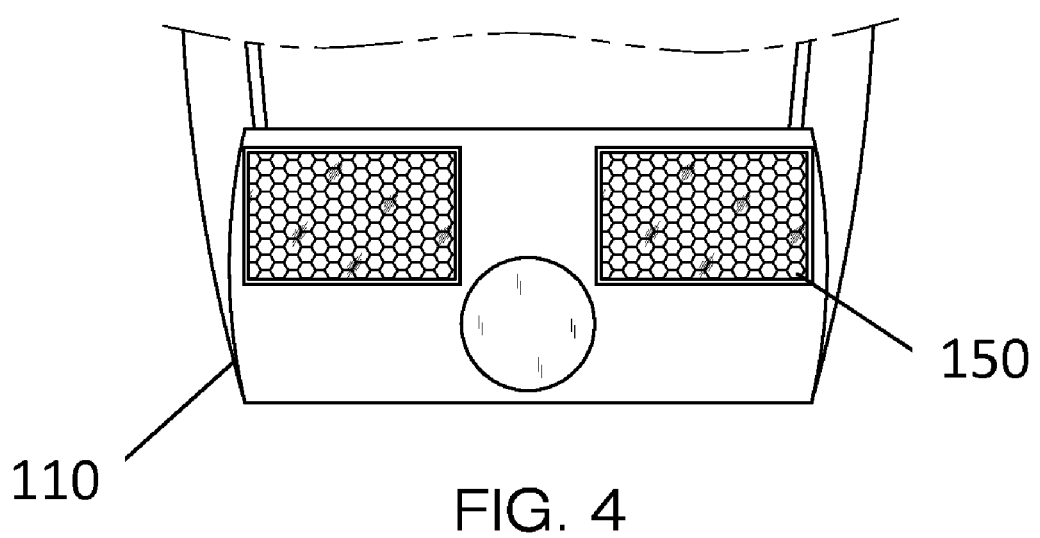
FIG. 4 is a back view of the electric boat of the present invention.

A first wind turbine 210 and a second wind turbine 220 are each disposed in the base of the boat 100, for example the first wind turbine 210 is positioned on a first side (e.g., starboard) of the boat 100 and the second wind turbine 220 is positioned in the second side (e.g., port) of the boat 110 (see FIG. 2, FIG. 3). In some embodiments, a third wind turbine 225 is disposed on the upper enclosure 120. The wind turbines 210, 220, 225 are adapted to be driven by oncoming wind ultimately generate energy to charge the rechargeable battery 240.

The wind turbines 210, 220, 225 are operatively connected to a transformer (e.g., transformer's power inverter/charge controller 230). The transformer (e.g., transformer's power inverter/charge controller 230) is operatively connected to the rechargeable battery 240 (e.g., "battery bank"). In some embodiments, the first wind turbine 210 and second wind turbine 220 are operatively connected to a first drive shaft 310 (e.g., via knuckle joints 215) operatively connected to a first turbine system 320, which is operatively connected to the transformer's power inverter/charge controller 230. In some embodiments, the third wind turbine 225 is operatively connected to a second turbine system 360, which is operatively connected to the transformer's power inverter/charge controller 230.

Figure 5:
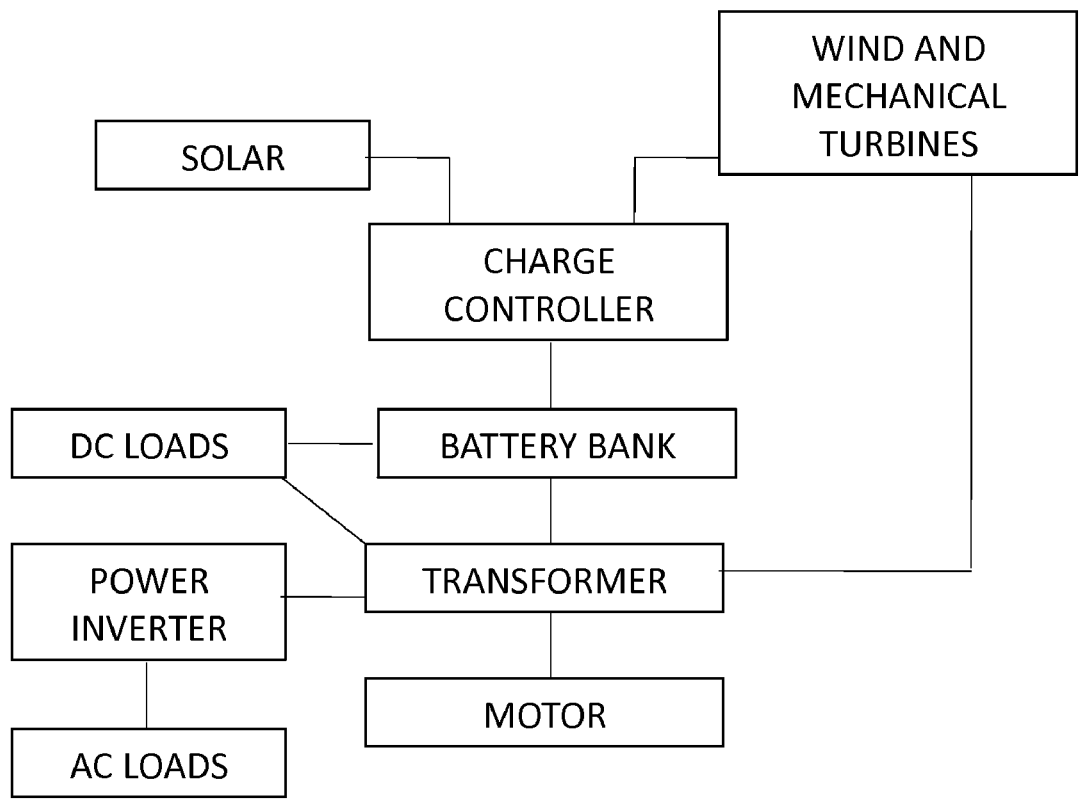
FIG. 5 is a schematic representation of the electrical components of the present invention.
Figure 6:
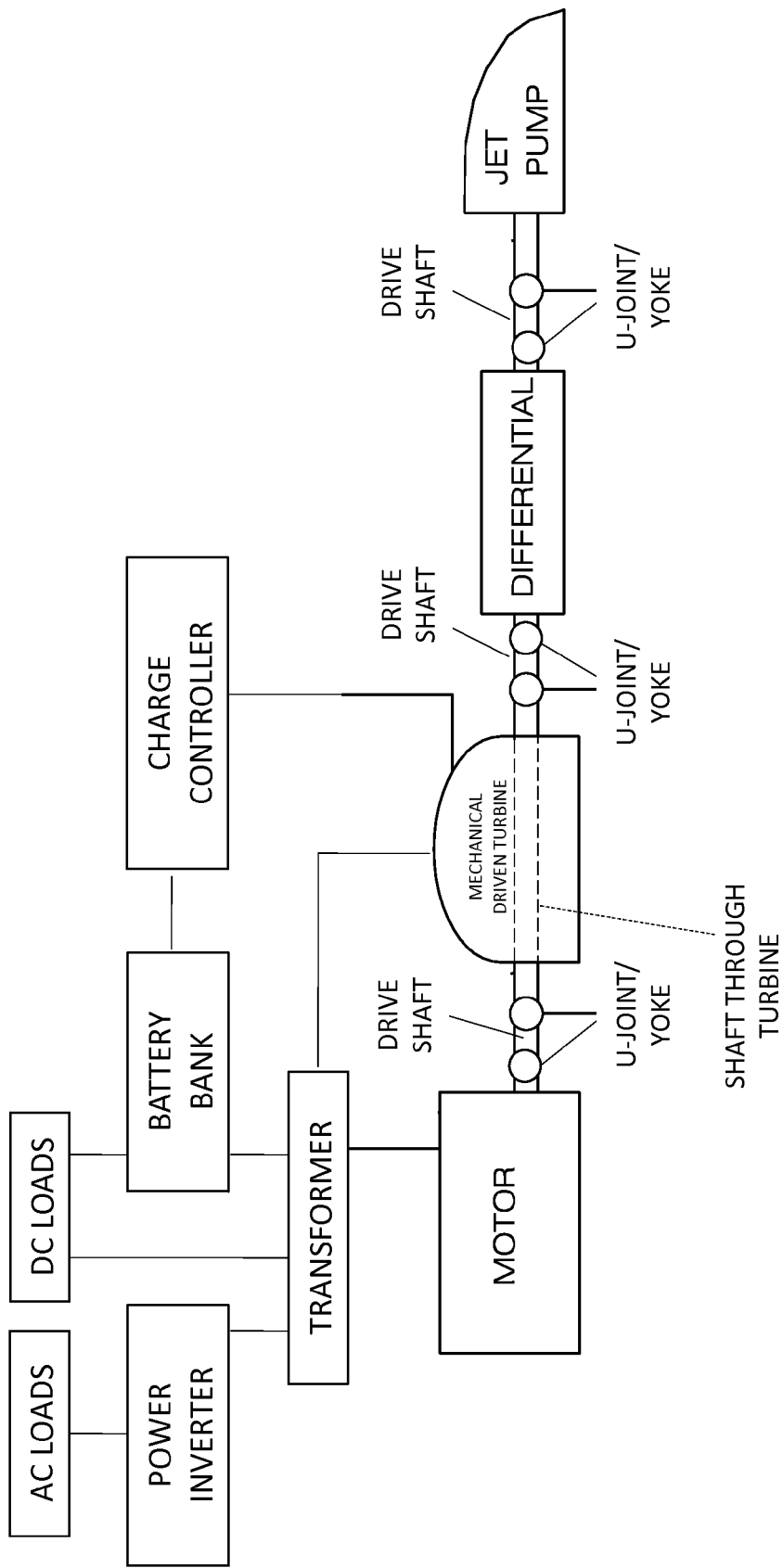
FIG. 6 is a schematic representation of various components of the present invention.
Figure 7:
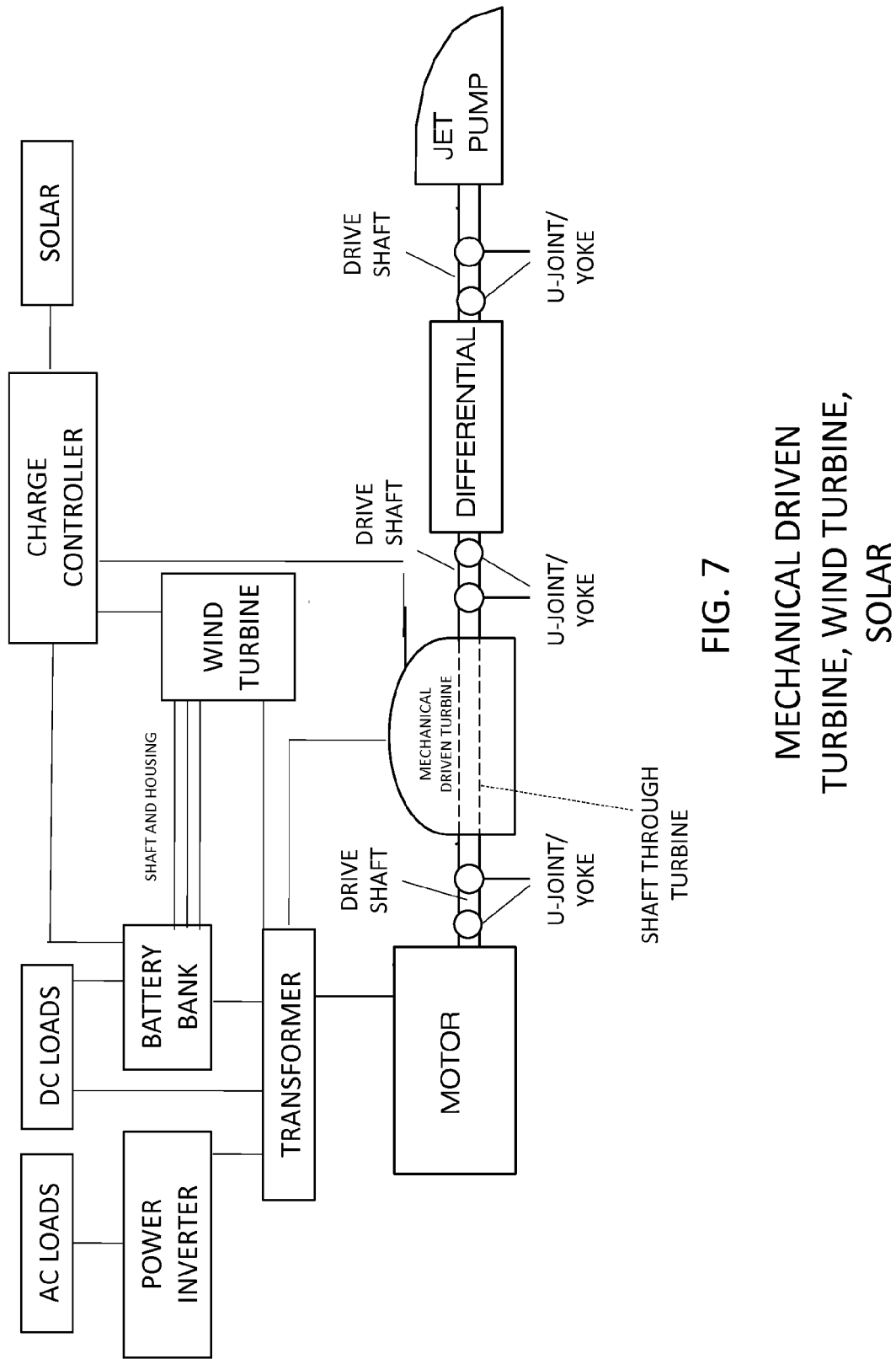
FIG. 7 is a schematic representation of various components of the present invention.

Referring now to FIGS. 5-7, in some embodiments, a motor 250 is operatively connected to the transformer. The electric motor 250 operates the boat 100 via a jet pump 450, for example the electric motor 250 is operatively connected to the jet pump 450 via motor drive shafts 460 (e.g., and a transfer case 470, see FIG. 1). As the electric motor 250 turns, the through shaft turbine begins to turn, therefore the turbine begins to generate energy at the same time the differential begins to turn (the same time the jet pump beings operation). The transformer is operatively connected to the power inverter as well as the battery (battery bank), and optionally any DC loads (the DC loads may be operatively connected to the battery bank as well). The inverter may be connected to any AC loads. In some embodiments, the battery bank is operatively connected to the charge controller and wind turbines. The charge controller is operatively connected to solar panels 150 as well as turbines (e.g., wind and/or mechanical turbines). The mechanical and wind turbines turbines may be further operatively connected to the transformer.

Several solar panels 150 are disposed on the boat 100 of the present invention, for example on the upper enclosure. Solar panels are well known to one of ordinary skill in the art. The solar panels 150 are operatively connected to the rechargeable battery 240 (e.g., via wiring 180, via the charge controller). The solar panels 150 function to charge the rechargeable battery 240.

The electric boat 100 of the present invention further comprises air conditioning and a global positioning system (GPS) device, each operatively connected to the transformer's power inverter/charge controller 230. In some embodiments, the electric boat 100 of the present invention further comprises a Doppler radar device.

The boat 100 of the present invention may also feature photovoltaic paint. In some embodiments, the turbine systems feature a dynamic generator system that includes a variable speed adjustor, which adjusts the speed accordingly to ensure safe and sufficient speeds. The boat 100 may include other features such as energy efficient appliances and lighting, a floor drain with a pump, a sewage system, a rear balcony. In some embodiments, the boat 100 is designed as a sailboat, fishing boat, or the like.

The following the disclosures of the following U.S. Patents are incorporated in their entirety by reference herein: U.S. Pat. No. 4,324,985; U.S. Pat. No. 7,047,902; U.S. Pat. No. 4,610,632; U.S. Pat. No. 6,273,015; U.S. Pat. No. 4,497,631; U.S. Pat. Application No. 2004/0026930.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An electric boat comprising:
  (a) a boat housing;
  (b) a rechargeable battery disposed in the boat housing, the battery is operatively connected to a transformer;
  (c) a first wind turbine disposed in a first side of the boat housing and a second wind turbine disposed in a second side of the boat housing, the wind turbines are driven by oncoming wind, the wind turbines are each operatively connected to the battery and to the transformer;
  (d) an electric motor operatively connected to the transformer;
  (e) a first mechanical turbine system operatively connected to the motor via a first drive shaft and to the transformer;
  (f) a charge controller operatively connected to the battery, the wind turbines, and the mechanical turbine system;
  (g) jet pump for propelling the boat, the jet pump is operatively connected to the electric motor via the mechanical turbine system; and
  (h) a plurality of solar panels disposed on the boat housing, the solar panels are operatively connected to the charge controller, the solar panels function to provide power to the rechargeable battery.

2. The electric boat of claim 1 further comprising a third wind turbine operatively connected to the battery, the transformer, and the charge controller.

3. The electric boat of claim 1 further comprising a power inverter operatively connected to the transformer.

4. The electric boat of claim 1, wherein the electric motor is operatively connected to the jet pump via motor drive shafts.

\* \* \* \* \*